Oct. 9, 1928.
A. F. SULZER
MOTION PICTURE FILM STRIP
Filed Aug. 23, 1926
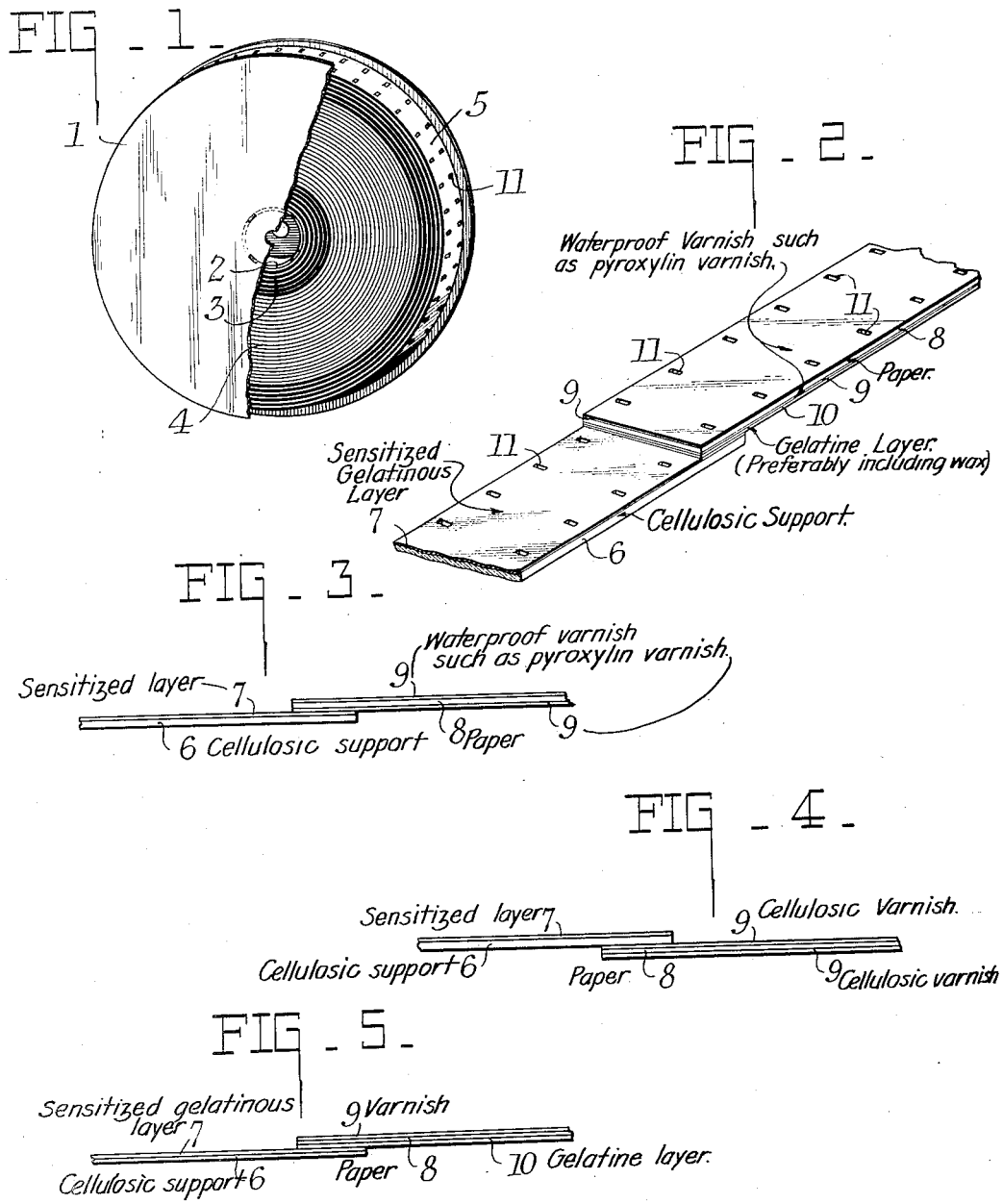
Albert F. Sulzer,
INVENTOR.

Patented Oct. 9, 1928.

1,687,044

UNITED STATES PATENT OFFICE.

ALBERT F. SULZER, OF ROCHESTER, NEW YORK, ASSIGNOR TO EASTMAN KODAK COMPANY, OF ROCHESTER, NEW YORK, A CORPORATION OF NEW YORK.

MOTION-PICTURE-FILM STRIP.

Application filed August 23, 1926. Serial No. 130,812.

This invention relates to motion picture film and more particularly to such film as is furnished in a cartridge for daylight loading in a portable camera.

As thus furnished, a typical cartridge comprises a reel having wound thereon a film strip comprising a sensitized film band with protective paper bands attached to the ends thereof. This may be used in cameras of various types, typical examples being shown in the patents to Tessier, 1,572,252, granted Feb. 9, 1926; and Wittel, 1,588,082, granted June 8, 1926.

In such apparatus, the film strip is fed in self-supported loops from a feeding means, such as a sprocket, to a gate and from the gate to a feeding means. The sensitized film band, being of a plastic cellulosic material such as a composition of cellulose acetate, cellulose nitrate, cellulose ether, viscose, or the like, (preferably acetate) is sufficiently stiff and elastic to maintain such loops without difficulty. The paper protective bands, however, have much less body and there is sometimes a tendency for them to buckle as they are being fed through the mechanism. This is particularly liable to be the case where the cartridge has been subjected to humid atmospheric conditions tending to make the paper especially limp. Under such conditions, moreover, the protection afforded the sensitive film band by the paper against atmospheric influences is lessened.

The objects of my invention are, therefore, to increase the stiffness and elasticity of the protective bands, to render such bands waterproof, and thus to increase the protection afforded the sensitized film, and to render them readily attachable to the film. These and other objects are attained by applying to one or both surfaces of the paper leader band, a layer or coating of cellulosic varnish, or like stiffening and waterproofing material. There may be further applied to one surface of the leader band a coating of gelatine, by which the band is the more readily applied to the sensitized film, and this layer may include wax.

Reference will now be made to the accompanying drawing wherein the same reference characters denote the same parts throughout.

Fig. 1 is a perspective view of a reel of film embodying my invention, one flange being partly broken away:

Fig. 2 is a perpective view on an enlarged scale of a portion of the film strip, including the junction of the sensitized portion and a lead band:

Figs. 3, 4 and 5 are edge views of similar fragments showing modified forms of my invention.

In Figs. 2, 3, 4 and 5 the thicknesses are, for the sake of clearness, much exaggerated.

The film cartridge, as furnished for camera use, comprises a reel having side flanges 1, and a core 2, upon which is wound a protective portion 3, coiled directly on the core, an unexposed sensitized film portion 4 attached at one end to the outer end of the protective portion 3 and an outer leader band or protective portion 5 attached at one end to the outer end of the coiled sensitized portion 4 and wound around it, the protective portions 3 and 5 thus forming continuations of the sensitized portion 4 and the three portions 3, 4 and 5 constituting in effect a single, coiled film strip having the usual perforations 11.

The sensitized portion consists, as is usual, of a support 6 made from a plastic cellulosic material, as mentioned above, upon one surface of which is a light sensitive photographic layer 7, such for instance, as of gelatino-silver-halide emulsion.

The leader band 5 consists of a paper band 8 which has been drawn through a suitable varnish whereby the paper is coated upon both surfaces with a thin layer 9 of such varnish. The varnish will, to a certain extent, penetrate and impregnate the paper, making a thoroughly waterproof material. The varnish layers also add materially to the normal stiffness of the paper and thus tend, not only to prevent the paper from becoming limp due to the effect of moisture, but to increase its natural stiffness and elasticity. Of course, the varnish can be applied to the paper by any other desired coating or impregnating process.

Such a protective band is preferably applied to the gelatine side of the film portion 4, as shown in Fig. 3, as by the use of acetic acid as an adhesive material; or it may be applied to the support side as indicated in Fig. 4, by the use of any common solvent or known film cement such as a mixture of equal volumes of acetone, methyl alcohol, butyl acetate, and methyl acetate.

I prefer, however, in order to obtain the most dependable splice between the portions, to coat upon one of the varnished surfaces 9 of the protective portion a layer or sizing of gelatine 10, and then to glue, paste or cement this gelatine layer 10, to the gelatino-halide layer 7, this being shown in Fig. 2.

In the form shown in Fig. 5, the paper band 8 has a cellulosic varnish layer 9, on one surface only, and on the other surface a gelatine layer 10, which is adherent to the sensitized gelatine layer 7.

As shown particularly in Figs. 2 and 3, the varnish layers 9 are much thinner than the paper 10, but as noted above these parts are shown as exaggerated in thickness and are not drawn to scale.

If desired, the gelatine coating 10 may have incorporated therein or applied thereto any suitable wax to prevent its being deleteriously affected by moisture, and also rendering it more easily slidable through the apparatus.

One way of doing this is by adding the wax to a heated 10% gelatine size solution, and adding enough soap to produce emulsification. The amount of wax used is five percent by weight of the gelatine solution, and the amount of soap necessary is from one-half to two percent. The wax used would be one having a melting point below the temperature employed. Any suitable organic or inorganic wax, such as paraffine wax or beeswax may be used. In general, the temperature reached and the time for which the solution is maintained at that temperature, are such that the particular gelatine used will not be harmfully broken down or deleteriously affected. The proportions given are, of course, by way of example.

This mixture is preliminarily stirred and then homogenized to a colloidal state in any suitable apparatus or mill. It may be applied by any suitable coating method, as by brushes or rolls. After the coating has hardened, it is calendered.

The varnish or cellulosic layer or layers are preferably applied to the paper when the latter is in the form of a long band of considerable width, and this is then slitted and cut to the sizes desired.

Any of the well known varnishes having the properties specified may be used, such as those embodying a cellulosic ester or ether, typical ones that are satisfactory being the following:

|  | Parts by weight |
|---|---|
| I, Cellulose nitrate | 100 |
| Fusel oil or butyl alcohol | 50 |
| Methyl alcohol | 900-2000 |
| Camphor | 10-30 |
| or II, Cellulose acetate | 100 |
| Diethyl phthalate | 10-50 |
| Acetone | 900-2000 |
| or III, Water-insoluble ethyl Cellulose—Low viscosity Preferred | 100 |
| Toluol | 10-50 |
| Volatile solvent (mixture of methyl acetate with one ninth its weight of methyl alcohol | 900-2000 |

In the above formulæ, the cellulose ester or ether used is preferably one of low viscosity, such for instance as is used in easy flowing lacquers and lacquers intended to be applied by spraying, though I do not limit myself thereto.

The specific forms herein disclosed are by way of example. It is obvious that numerous embodiments are possible, and I contemplate as within my invention all such modifications and equivalents as fall within the scope of the appended claims.

Having thus described my invention, what I claim as new and desire to secure by Letters Patent is:

1. A motion picture film strip including a band of sensitized film with an unsensitized protective band at each end thereon, one end of each protective band being secured to one end of the film band, and each protective band comprising a strip of paper and a layer of stiffening and waterproofing cellulosic composition.

2. A motion picture film strip including a band of sensitized film comprising a support of flexible cellulosic material with a sensitized, gelatinous layer thereon and a leader band comprising a strip of paper, the leader band carrying a layer of stiffening and waterproofing varnish upon one surface and carrying upon the other a layer of gelatine, one end of the leader band having its gelatine surface adherently attached to the gelatinous layer at one end of the film band.

3. As an article of manufacture, a strip of coiled material adapted for use in a motion picture apparatus and including a coiled sensitized film band comprising a cellulosic support having on one surface a sensitized, gelatinous layer, and a leader band attached at one end to the outer end of the coiled film and coiled around said film, said leader band including a strip of paper and a layer of stiffening and waterproofing cellulosic material and having on one surface a layer of gelatine, the two bands having their gelatine layers adherently attached together.

4. As an article of manufacture, a strip of coiled material adapted for use in a motion picture apparatus and including a coiled sensitized film band comprising a cellulosic film support having on one surface a sensitized, gelatinous layer, and a leader band attached at one end to the outer end of the coiled film and coiled around said film, said leader band comprising a strip of paper having on each surface a layer of cellulosic varnish and having additionally on one surface a layer of unsensitized gelatine, the two bands having their gelatine layers adherently attached together.

5. A motion picture film strip including a band of sensitized material and a protective band forming a continuation thereof and having on one surface a deposit embodying wax.

6. A motion picture film strip including a band of sensitized material and a protective band forming a continuation thereof and comprising a strip of paper and having upon one surface a layer of waterproof cellulosic composition and upon the other surface a layer embodying wax.

7. A motion picture film strip including a band of sensitized material and a protective band forming a continuation thereof and comprising a strip of paper and having upon one surface a layer of waterproof cellulosic composition and upon the other surface a layer embodying gelatine and wax.

8. As an article of manufacture, a strip of coiled material adapted for use in a motion picture camera and including a coiled sensitized film band comprising a cellulosic surface having upon one surface a sensitized, gelatinous layer, and a leader band attached at one end to the outer end of the coiled film and coiled around said film, said leader band including a strip of paper and a layer of waterproof cellulosic material and having on one surface a layer including gelatine and wax, the two bands having their gelatine layers adherently attached together.

9. As an article of manufacture, a strip of coiled material adapted for use in a motion picture camera and including a coiled film band comprising a cellulosic film support having on one surface an unexposed sensitized, gelatinous layer, and a leader band attached at one end to the outer end of the coiled film band and coiled around said film band, said leader band comprising a strip of paper having on each surface a layer of stiffening and waterproofing cellulosic varnish, and having additionally on one surface an unsensitized layer including gelatine and wax, the two bands having their gelatinous layers adherently attached together.

Signed at Rochester, New York, this 18th day of August, 1926.

ALBERT F. SULZER.